United States Patent [19]

Belek et al.

[11] Patent Number: 4,849,719

[45] Date of Patent: Jul. 18, 1989

[54] LOW LOSS ELECTRO-OPTIC MODULATOR MOUNT

[75] Inventors: Ronald E. Belek, Coventry; Robert J. Mongeon, South Windsor; Lanny M. Laughman, Bolton, all of Conn.

[73] Assignee: The United States of America as represented by the Secretary of the Air Force, Washington, D.C.

[21] Appl. No.: 642,907

[22] Filed: Aug. 21, 1984

[51] Int. Cl.[4] .......................... H01S 1/00; G02B 5/30
[52] U.S. Cl. ................................ 332/7.51; 350/392; 372/33; 372/36
[58] Field of Search ............... 332/7.51; 350/392, 406; 372/36, 41, 33, 34, 87

[56] References Cited

U.S. PATENT DOCUMENTS

| | | | |
|---|---|---|---|
| 3,322,485 | 6/1967 | Williams | 350/160 |
| 3,653,743 | 4/1972 | Kiefer et al. | 350/392 |
| 3,914,021 | 10/1975 | Nishimura | 350/160 LC |
| 3,958,862 | 5/1976 | Scibor-Rylski | 350/160 R |
| 4,054,362 | 10/1977 | Baues | 350/96 WG |
| 4,131,911 | 12/1978 | Fujine et al. | 372/34 |
| 4,214,819 | 7/1980 | Pohl et al. | 350/334 |
| 4,229,079 | 10/1980 | Wayne et al. | 372/13 |
| 4,334,734 | 6/1982 | Hareng et al. | 350/331 R |

OTHER PUBLICATIONS

AFWAL-TR-81-1190, "Modulated Coherent Source Development Project," Nov. 1981, Cover Page, Report Documentation Pages and pp. 31, 32, 33 and 34.

Primary Examiner—Nelson Moskowitz
Attorney, Agent, or Firm—Bernard E. Franz; Donald J. Singer

[57] ABSTRACT

The crystal is solid CdTe or GaAs for modulating a laser beam. The mount comprises $Al_2O_3$ or BeO ceramic between the crystal and a U-shaped aluminum housing on three sides to provide low stray capacitance and high thermal conductivity to the cooled housing. A layer of lead between the ceramic and the housing enhances the acoustic damping of the structure. Electrodes are attached to the crystal, with lead used to enhance dissipation of acoustic energy. in contacting flexible tabs on the electrodes with terminals no pressure or stress is transmitted to the crystal, thereby eliminating a problem of stress-induced birefringence.

2 Claims, 2 Drawing Sheets

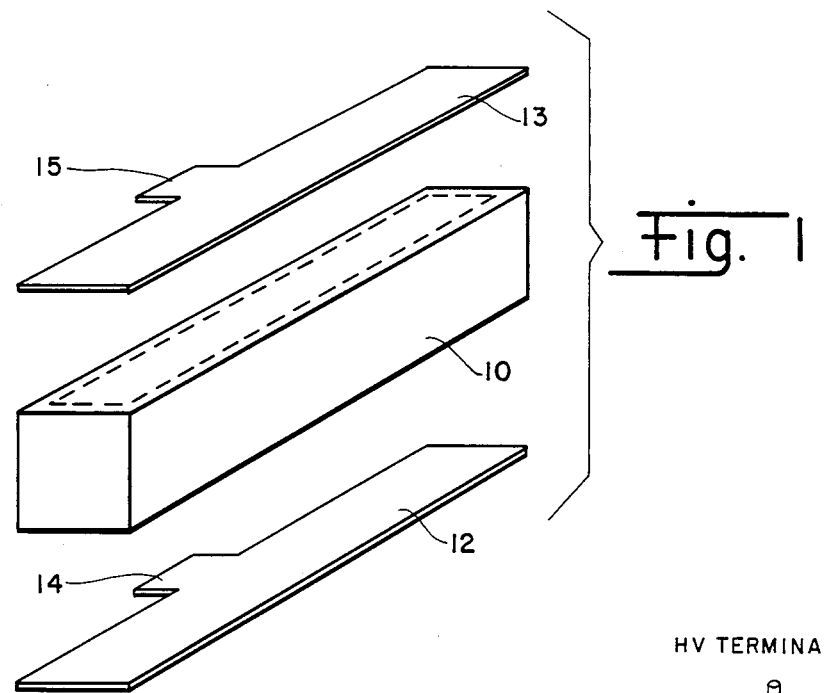
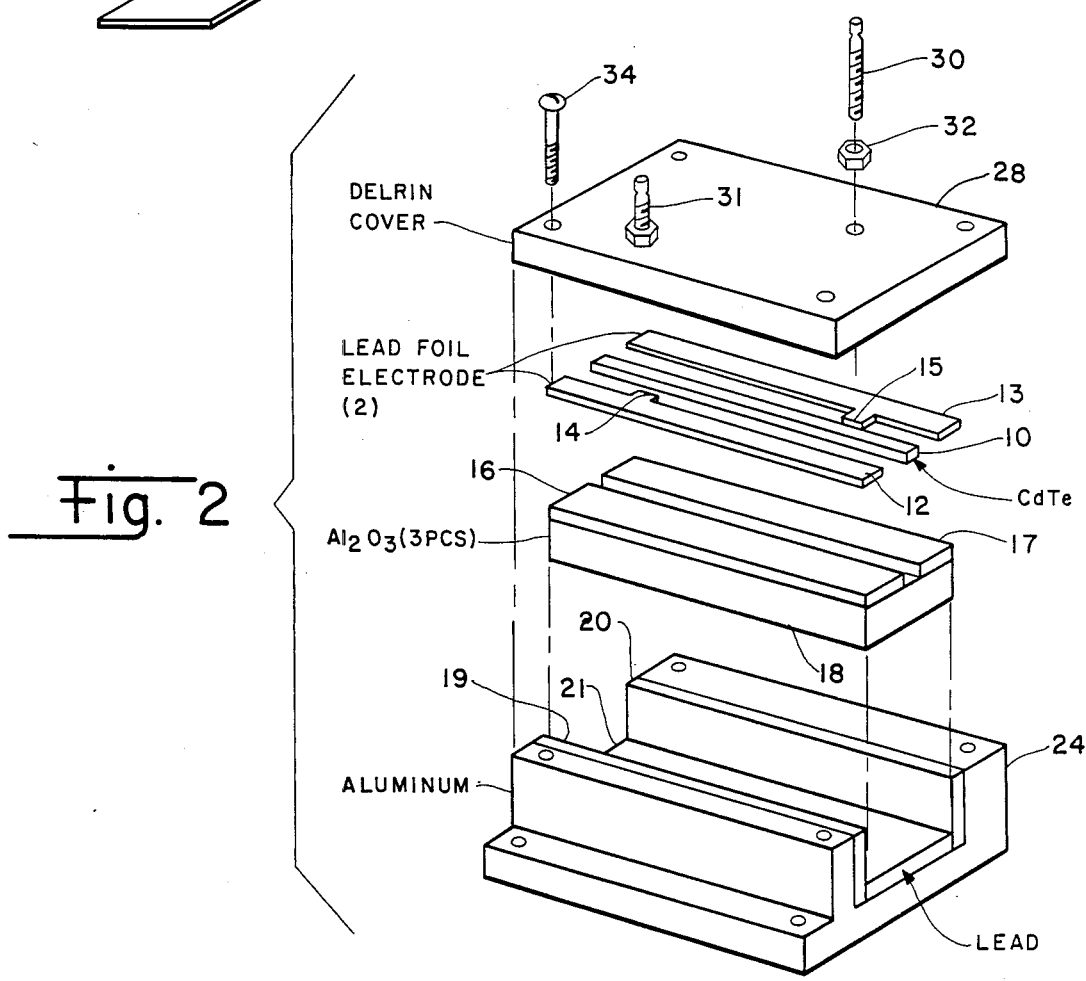

LOW LOSS ELECTRO-OPTIC MODULATOR MOUNT

RIGHTS OF THE GOVERNMENT

The invention described herein may be manufactured and used by or for the Government of the United States for all governmental purposes without the payment of any royalty.

BACKGROUND OF THE INVENTION

This invention relates to an electro-optic crystal modulator holder, and more particularly to a holder for a solid crystal such as CdTe or GaAs for modulating a laser beam.

Several United States patents are of interest in showing the state of the art relating to crystal modulators and crystal mounts. U.S. Pat. No. 3,322,485 to Williams shows an electro-optical device having conductive leads attached to conductive films layered on spaced plates. U.S. Pat. No. 3,914,021 to Nishimura teaches a liquid crystal device including a frame of molded plastic for supporting conductive plates. U.S. Pat. No. 3,958,862 to Scibor-Rylski discloses a modulator comprising a block of electro-optical material and electrodes on one face of the block. U.S. Pat. No. 4,054,362 to Baues shows a modulator including a liquid or solid crystal disposed on a substrate, the crystal being coated with a dielectricmaterial. U.S. Pat. Nos. 4,214,819 to Pohl et al and 4,334,734 to Hareng et al teach electro-optical modulators having a liquid crystal layer sandwiched between crossed polarizers.

A number of modulator drive waveforms of interest for laser radar applications require short rise and fall times. Cavity dumped waveforms may require voltage fall times of less than 50 nanoseconds for a modulator charged to 2700 v. Minimization of fall time requires reducing both the intrinsic and stray modulator capacitance to a minimum. If in addition the modulator is required to transmit high average powers (10-200 watts) it is also necessary to provide adequate modulator cooling to minimize thermally-induced mode instabilities and even modulator damage. Other properties which are desirable in a modulator holder include high voltage isolation (greater that or equal to 3.5 kv for 5 mm CdTe crystal) of the modulator, low RF loss for RF modulator waveforms, stress-free electrical contacting of the modulator crystal, and acoustic damping of the modulator crystal.

SUMMARY OF THE INVENTION

Objects of the invention include providing a holder design which has the desirable properties discussed above, including (1) good thermal sinking of the crystal, (2) low capacitance from the crystal to ground, and (3) good acoustic absorption.

The invention relates to a modulator holder which provides these properties in a practical modulator holder, comprising ceramic insulating material such as alumina or beryllium oxide enclosing the crystal modulator on three sides, with an aluminum outer casing, and lead plates between the ceramic and the casing. Contacts of lead foil are attached to opposite faces of the crystal with a conductive paint.

The ratio of thermal conductivity to dielectric constant is larger for alumina ($Al_2O_3$) or beryllium oxide (BeO) ceramic than for other dielectrics such as lucite or glass-epoxy laminates which are often used for modulator holders. The use of $Al_2O_3$ or BeO ceramic permits the crystal to be located far enough from electrical ground to reduce stray capacitance to approximately 10 picofarads, while providing a high thermal conductivity to the cooled metallic housing. $Al_2O_3$ and BeO ceramics are also very low RF loss which greatly facilitates generation of RF modulated laser waveforms which have high average output power (greater than 10 watts). The layer of lead between the ceramic and the aluminum exterior enhances the acoustic damping of the structure. Lead is also used for the electrodes attached to the modulator to enhance dissipation of acoustic energy. In contacting flexible tabs with leads to the external circuit no pressure or stress is transmitted to the crystal, thereby eliminating the problem of stress-induced birefringence.

In summary, we have conceived and reduced to practice an electro-optic modulator holder which combines the following features:
1. Excellent heat sinking of the modulator crystal
2. Minimum stray capacitance
3. High voltage isolation of the crystal
4. Low RF loss
5. Good acoustic damping

BRIEF DESCRIPTION OF THE DRAWING

FIG. 1 is a view in oblique projection of a modulator crystal and two contact foils, shown separated;

FIG. 2 is an exploded view of a crystal and its mounting structure; and

DETAILED DESCRIPTION

Figure 3:
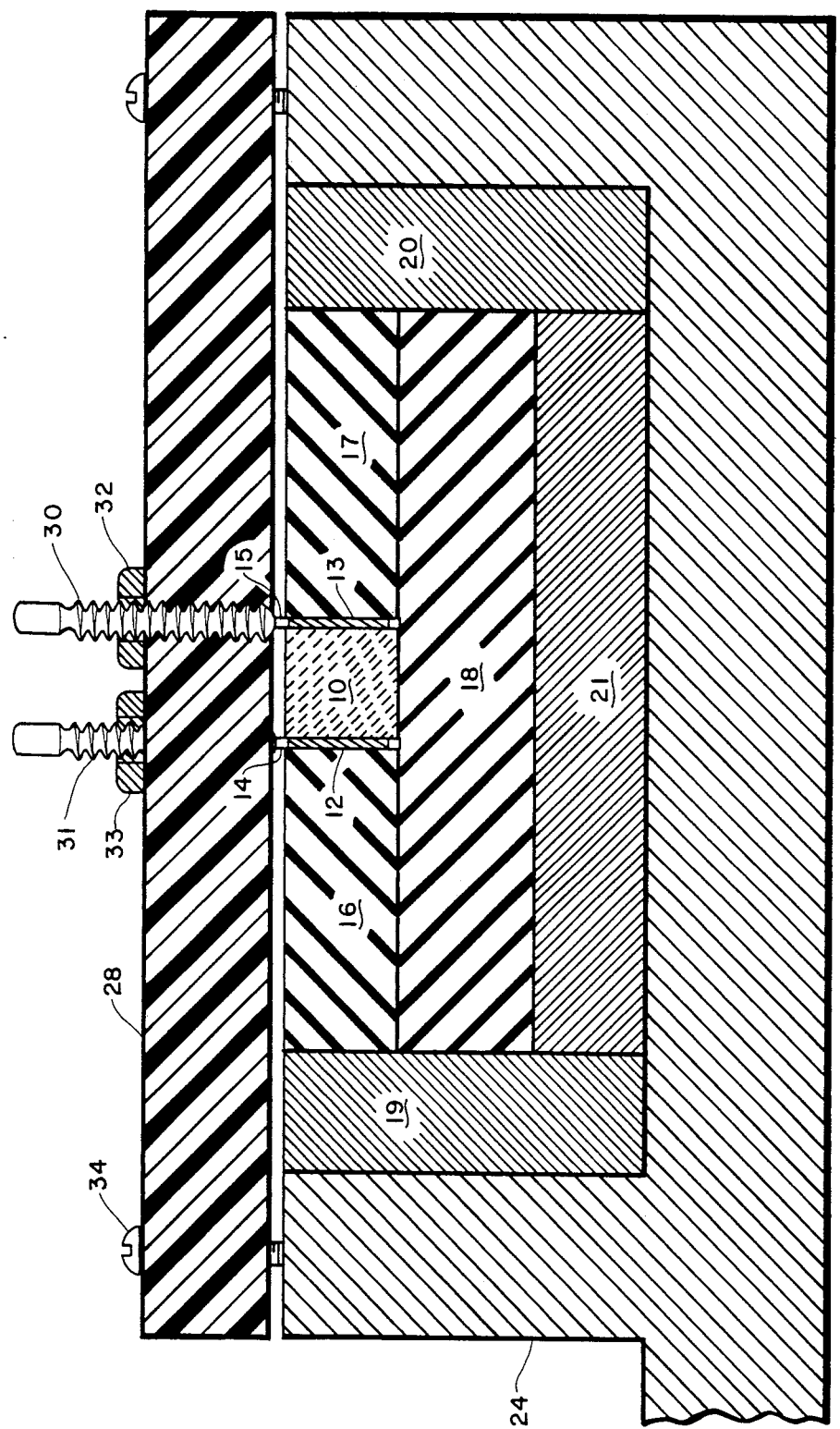
FIG. 3 is a cross-section view of the assembled structure of FIG. 2.

The modulator holder design is an important consideration for proper operation of the modulator. There are three important factors that should be considered in this holder design: (1) the holder should provide good thermal sinking of the crystal, (2) it should have low capacitance from the crystal to ground, and (3) it should be a good acoustic absorber. In FIG. 2 is shown an assembly diagram of the holder design that meets these three requirements and was used for modulated laser testing. A cross-section view is shown in FIG. 3.

FIG. 1 shows a crystal 10 used as an electro-optic crystal modulator in a laser system for radar applications. In a modulator which was tested in a system, the crystal dimensions are 4×4×50 millimeters. An anti-reflective coating may be used on each of the ends. The crystal may be gallium arsenide (GaAs), but in the tested embodiment cadmium telluride (CdTe) was used. On two opposite faces along the length of the crystal, silver conductor paint provides a compliant bond between the electrodes and the crystal. The lead foil electrodes 12 and 13 are typically 0.002 inches (approximately 0.05 mm) thick. The electrodes have flexible tabs 14 and 15 respectively for stress-free connection to an electrical driver circuit.

As shown in FIGS. 2 and 3, the mount comprises an aluminum body 24, lead plates 19, 20 and 21, alumina ($Al_2O_3$) insulators 16, 17 and 18, the electrodes 12 and 13 on opposite sides of the crystal 10, a Delrin cover 28, four screws such as 34 for fastening the cover to the aluminum body, and high voltage terminals 30 and 31 mounted in the cover to contact the tabs 14 and 15. The terminals have lock nuts 32 and 33.

Good thermal sinking of the modulator is required to prevent electrical damage of the crystal. In addition, fluctuations in the crystal temperature will affect the optical cavity length through the thermal dependence of the index of refraction on temperature. High thermal dissipation in the mount was achieved by close coupling the modulator on three sides with high thermal conductivity aluminum oxide insulators 16, 17 and 18. These insulators are then close coupled to the u-shaped aluminum body 24 of the mount through three lead plates 19, 20 and 21. The aluminum body is then mechanically, and therefore, thermally attached to the rest of the cooled laser structure. Electrical connections to the crystal are made by connecting two lead foil electrodes 12 and 13 to the crystal with silver paint which are in turn connected to the outside with two H.V. contact terminals 30 and 31.

The capacitance to ground is made acceptably small by using thick aluminum oxide dielectric to surround the modulator (approximately 4 mm or greater). This low capacitance is required to increase the high frequency reactance to ground thereby reducing the rf driving power requirement. In the preferred modulator design this capacitance is approximately 20 picofarads and has been found to be quite acceptable.

Since linear electro-optic materials are also piezoelectric, distortion of the modulation characteristics of an electro-optic device can occur when it is electrically excited at frequencies near acoustic resonant frequencies. The distortion can become severe when the crystal is modulated by a high voltage rectangular pulse that contains a broad spectrum of frequencies as a result of the short rise and fall times. This can easily give rise to excitation of acousto-optic resonances. An estimate of these resonant frequencies can be made for rectangular crystals given the crystal dimensions and the sound velocity. The CdTe crystals used exhibit resonant frequencies on the order of a few hundred kilohertz.

To suppress the acoustic energy that is reflected from the crystal boundaries, the mounting structure should be acoustically lossy. Acoustic absorption in the mount was accomplished by the lead strip electrodes (lead being an excellent acoustic absorbing material), the three lead plates on the inner "U" of the aluminum body and the "Delrin" acetal homopolymer cover 28 which mechanically holds the modulator in place.

It is thought that the low loss electro-optic modulator mount having the improvements of the present invention and many of its attendant advantages will be understood from the foregoing description, and it will be apparent that various changes may be made in the form, construction and arrangement of the parts thereof without departing from the spirit and scope of the invention or sacrificing all of its material advantages, the form hereinbefore described being merely an exemplary embodiment thereof.

What is claimed is:

1. A mount for an electro-optic modulator having a solid crystal, comprising:

insulators having a thickness of at least approximately 4 millimeters located between the crystal and a metallic housing, said insulators being selected from the group consisting of alumina ($Al_2O_3$) and beryllium oxide (BeO) ceramics (which have a high ratio of thermal conductivity to dielectric constant), whereby the crystal is located far enough from electrical ground to reduce stray capacitance to a low value of approximately 20 picofarads or less, while providing thermal conductivity to the metallic housing;

a layer of lead between the insulators and the metallic housing, to thereby enhance the acoustic damping of the mount;

electrodes attached to the crystal, the electrodes being of lead to enhance dissipation of acoustic energy, the electrodes having flexible tabs, with terminals contacting the tabs such that no pressure or stress is transmitted to the crystal;

wherein the metalic housing is of aluminum having a U-shaped form, with the insulators and layer of lead surrounding the crystal on three sides, and further including an insulating cover fastened to the metallic housing to form a fourth side of the mount, the ends of the crystal being exposed for passage of a laser beam.

2. A mount according to claim 1, the solid crystal being gallium arsenide (GaAs) or cadmium telluride (CdTe) with dimensions of aproximately $4 \times 4 \times 50$ millimeters;

wherein two opposite faces along the length of the crystal have silver conductor paint which provides a compliant bond between the electrodes and the crystal, wherein said electrodes are approximately 0.05 millimeters thick, and wherein said terminals are threaded through said cover;

wherein there are two of said insulators substantially the same thickness as the crystal and mounted on either side adjacent to the electrodes, and a third insulator is below them and the crystal with a width equal to the combined width of the crystal, the two electrodes and the two insulators on either side;

wherein said layer of lead comprises three pieces, one below said third insulator and of the same width, and the other two being on either side of it and the insulators;

the insulators, the electrodes except for the tabs, the layer of lead, and the cover, all being substantially the same length as the crystal.

* * * * *